Patented Oct. 29, 1946

2,410,171

UNITED STATES PATENT OFFICE 2,410,171

GLARE SHIELD

Lester R. Le Lande, Cincinnati, Ohio, assignor to The American Glare Shield Co., Inc., Cincinnati, Ohio, a corporation of Ohio Substituted for abandoned application Serial No. 420,995, November 29, 1941. This application June 6, 1945, Serial No. 597,737

2 Claims. (Cl. 296—97)

My invention relates to devices used on motor vehicles to subdue the glare of light from other vehicles or other sources for the driver of the vehicle provided with the device; and more particularly to such devices of the kind in which there is interposed between the driver's eyes and the place of approach of vehicles having the glaring lights, a transparent member having, by its color or tint, the property of subduing the glare. Such member usually is mounted between the driver and the windshield of his vehicle; and should, for efficiency and convenience, be adjustable to have different postures, depending upon the disposition of the vehicle parts, and also upon the posture and propensity of the driver. Such adjustment also depends upon the location of the glare that is to be subdued; for instance, in day time, the device may be used to subdue the glare of the sunlight instead of to subdue the glare of approaching vehicle lights at night. Such devices or shields have been mounted in various ways upon the windshield, or upon the stationary frame thereof, or other adjacent parts of the vehicle. This application is a substitution for my application filed November 29, 1941, Serial No. 420,995.

An object of my invention is to simplify the mounting of such a device or shield, while providing for a wide choice of places of mounting, for ready adjustability in the respects above noted in any place of mounting, and for rigidity of mounting, both as to attachment to the vehicle part and as to position into which the device is adjusted relative to its fixed location on the vehicle. A further object is to allow easy and quick adjustment with a minimum of effort of the user, while assuring such rigidity of the device in any of its positions to which it is adjusted.

Other objects will appear in the course of the following description, illustrated by the accompanying drawing in which—

Figure 1 is a perspective view of part of a motor vehicle, including the windshield thereof, with my improved glare shield mounted on the lower fixed frame part of the windshield, the latter being of the more recent two-part construction in which the windshield bays forward;

Fig. 2 is a plan view corresponding to the view in Fig. 1, with the driver of the vehicle represented and with the direction of the driver's vision through the shield represented by broken lines;

Fig. 3 is a schematic view with the windshield in vertical section on the plane of line 3—3 of Fig. 1 and adjacent front parts of the vehicle in like section, and with the shield, mounted as in Figs. 1 and 2, in end elevation;

Fig. 4 is a similar view but showing the shield mounted on the part of the frame above the windshield, and with dotted lines indicating a different position into which the shield is adjusted;

Fig. 5 is a similar view, upper parts being broken away, showing a mounting of the shield farther backward on the curved top of the dash board of the vehicle;

Fig. 6 is a similar view illustrating a windshield that is more nearly vertical than that illustrated in the preceding views, and showing the shield mounted still farther backward on the upper part of the vehicle dash board;

Fig. 7 is a rear elevation of the shield, i. e., as seen by the driver of the vehicle;

Fig. 8 is a vertical cross section on the plane of the line 8—8 of Fig. 7, on a somewhat larger scale;

Fig. 9 is a cross section on the plane of the line 9—9 of Fig. 8;

In the example disclosed, the shield member 1 is a plate of glass, which, it will be understood, is tinted of a color which allows clear visibility but which filters out the more glaring components of the light, as for instance a pale blue of the right shade, or a pale amber color. Also it will be understood that this member or plate 1 may be of transparent material other than glass, as for instance a transparent plastic composition. The plate 1 as here shown is oblong with its greater dimension horizontal and about twice its vertical dimension, and the corners are rounded. However, other shapes may occur. Straddling the lower edge of plate 1 is a channel 2, which may be of sheet metal or the like which firmly clasps the plate 1 and serves as a finger hold.

The shank 3, which may be of metal or other strong material has at one end a channel 4 that straddles the upper edge part of plate 1, and has at its other end a head 5. From the middle of channel 4, extending toward the head end and in the direction of the length of channel 4 along the edge of plate 1, the shank 3 has a slit 6. This slit 6 is crossed by a threaded opening 7 which extends through the shank 3 from rear to front. A clamp screw 8 having, as here shown, its head at the rear, is threaded into the part of opening 7 at the front of the slit 6; it being understood that the rear part of opening 7 is unthreaded. Thus the screw 8 may be turned to draw the rear and front parts of the shank and its channel 4 together. A cushioning channel 9 straddles the plate edge part within the channel 4; being of a material of such properties that it not only cushions the pressure of clamping of the two parts or jaws of channel 4 on the plate 1, but, under that pressure, has a high degree of friction with the channel side walls and with the two sides of the plate edge portion. Such material may be, for instance, rubber, or a composition of rubber and fabric, a soft but strong fiber sheet, or similar material.

Also, as here shown, a strip of yielding material 10, which may be material such as any just mentioned, is held in the slit 6; having an opening through which screw 8 extends. This inserted strip 10 acts to prevent excessive approach of the parts or jaws of channel 4, such as might mash the sides of cushion channel 9 and allow changing contact of the parts or jaws with plate 1; thus limiting the tightening to that required for proper frictional clamping by means of cushion channel 9. The crossing portion of cushion channel 9 is pressed tightly between the edge of plate 1 and the crotch part of clamping channel 4; so that there is effective friction also between the plate edge and said crotch part; and this friction is augmented by the bearing of the edge of inserted cushion strip 10 against the adjacent surface of the cross part of cushion channel 9.

These provisions of the cushion-friction means, in whole or part as just described, are of importance in enabling a single mounting means, midway of the length of the edge of plate 1, to hold the plate 1 rigidly to the mounting means under jars of the vehicle operation. The rigid holding effect also is enhanced by the proportioning of the clamping channel 4; it being elongated along the plate edge considerably relative to its reach inward from the edge. This is in conformity with the requirements, in that sidewise and up-and-down jars of the vehicle preponderate over front-and-back vibrations, and the plate 1, in its use position has, in any adjustment, a much more vertical than horizontal posture. By providing such efficient connection between plate 1 and the mounting means, permitting a single mounting means to hold the plate 1 securely against the jars and vibrations of vehicle travel, I am enabled greatly to simplify both the initial construction of the shield device and the work of installing the device on a vehicle, and, as will be seen, to permit a much wider choice of locations and postures of the mounting on the vehicle, than with certain prior constructions. Among these may be mentioned my prior construction disclosed in my Patent No. 1,546,739, issued July 21, 1925, which uses two mounting devices each near a respective end of the plate and joined by a bar, and by respective clamp means for attachment of the mountings to the vehicle; requiring about three times as much material and about twice as much work in manufacture, as well as about twice as much work to install the device on the vehicle, with much less choice of location of the device, owing to the extensive and cumbersome structure of the two-clamp mounting, aside from the restricted usefulness of the clamps disclosed in my prior patent.

My present mounting comprises, in conjunction with the shank 3 and its head 5, the support member 11; the connection between shank 3 and member 11 permitting ready swinging adjustment of plate 1 relative to the vehicle part to which support member 11 is fixed, and being adapted to hold the plate 1 firmly in its adjusted positions. This adjusting connection resembles that disclosed in my prior patent above cited, and to that extent is only exemplary herein. The head 5 of shank 3 is generally circular around a central opening 12, with a series of detent recesses 13 in its periphery for a major portion of the extent thereof that lies outward from the shank body; and at one side, which is the front, close to the last recess 13 at that side, a lug 14 projects past the remainder of the periphery. The support member 11 comprises the pedestal part 15 having at one end the spaced ears 16 and at its other end a base 17. The ears 16 straddle the shank head 5 closely and have transverse openings registering with the central opening 12 of head 5. The opening 18 in one ear 16 is threaded; the one in the opposite ear 16 as well as the one 12 in shank head 5 being of size to take snugly the body of transverse screw 19 screwed into the threaded ear opening 18 with its head 20 tightly against the opposite ear. Shank 3, and with it the plate 1 firmly held thereby as above described, thus is held firmly between support ears 16 to turn on screw 19. Lengthwise, support pedestal part 15 has centrally of it the bore 21 in which slides a detent element 22 having compressed between it and the closed end of bore 21 next to base 17 a helical compression spring 23 which holds this element 22 yielding but firmly against the recessed periphery of shank head 5. The end of this element 22 is rounded to fit any one of the shank head recesses 13 and to yield and enter any next recess as head 5 turns. This detent element 22 may be of metal; but preferably is of material softer than that of head 5, so that it is the more worn, it being the more readily renewable. For this reason it may be of hard fiber, hard rubber or the like when the shank member and its head 5 are of metal. The lug 14 engages with the side of support pedestal part 15 to positively limit the swinging of the shank member and plate 1 at one end of its adjustment. This is to prevent inadvertent adjustment of the plate 1 too close to windshield A as seen in Fig. 4, for instance.

The base 17 is oblong, extending at each side of the pedestal part 15, with screw holes 24, one in each side part; these being, as here shown, countersunk for flat head screws 25 seen in Figs. 1 and 2, which may be machine screws for attachment to metal, or wood screws for attachment to wood or the like. An improvement in this means for attachment is the concavity 26 of the exposed side of this base 17 that contacts with the surface to which the glare shield is to be attached. The curvature of this concavity 26 is crosswise of base 17, uniform for the length of the base, leaving longer edge portions straight, as at 27. Thus, the base 17 may fit convex surfaces, such as surface $a$ of the bead along the lower edge of windshield A in Fig. 3, or surface $b$ at the top of the dash board in Figs. 5 and 6, at different places around the convexities of these surfaces as indicated. If the surface is plane, as at $c$ above windshield A in Fig. 4, the straight edges 27 give the base 17 a firm bearing on the surface.

It will be understood that modifications, not only in material but in details of construction and arrangement, may occur in practice, and that I am not limited to the rather precise disclosure herein, but

What I claim as new and desire to secure by Letters Patent is:

1. In a glare shield, a shield member having opposite continuously smooth areas frictionally clamping against opposite areas of a shank member comprising a channel straddling an edge part of said shield member and having the two sides of the channel relatively movable for clamping said shield member, means for drawing said two sides toward each other for frictionally clamping against said opposite areas of said shield member, means interposed between said sides and the shield member, of material which cushions the pressure of said sides on said shield member and also has a high degree of friction with the sides and shield member, and means for adjustably holding said shank member, and therewith said shield member, on a structure, constituting with said shank member, the sole means for supporting said shield member on said structure, the shank member having a slit whereby the two sides of the channel are relatively movable as above mentioned, and cushioning means in said slit, governing the degree of clamping pressure of the channel sides and presenting an edge to exert frictional pressure on that part of the edge of the shield member between said sides, said shank member having also an arm, for pivotally mounting it on the adjustable means for holding the same, said means comprising a base, and a projecting arm to which the shank arm is pivotally secured, said projecting arm being projected downwardly at less than a right angle to the base, whereby a stop on the shank arm engaging said projecting arm will co-act to hold the shank in a position to bring the shield member into substantially parallel relation to a windshield on which the base is mounted.

2. In a glare shield, a shield member having opposite continuously smooth areas frictionally clamping against opposite areas of a shank member comprising a channel straddling an edge part of said shield member and having the two sides of the channel relatively movable for clamping said shield member, means for drawing said two sides toward each other for frictionally clamping against said opposite areas of said shield member, means interposed between said sides and the shield member of material which cushions the pressure of said sides on said shield member and also has a high degree of friction with the sides and shield member, and means for adjustably holding said shank member and therewith said shield member on a structure, constituting with said shank member the sole means for supporting said shield member on said structure, the shank member having a slit whereby the two sides of the channel are relatively movable as above mentioned, said shank member having also an arm, for pivotally mounting it on the adjustable means for holding the same, said means comprising a base, and a projecting arm to which the shank arm is pivotally secured, said projecting arm being projected downwardly at less than a right angle to the base, and a stop on the shank arm engaging said projecting arm to co-act to hold the shank in a position to bring the shield member into substantially parallel relation to a slanting wind shield on which the base is mounted, when moved to said stopped position.

LESTER R. LE LANDE.